US012598238B2

(12) United States Patent
Heimler et al.

(10) Patent No.: US 12,598,238 B2
(45) Date of Patent: Apr. 7, 2026

(54) OPEN RESOURCE DISCOVERY OF ENTITY TYPES

(71) Applicant: SAP SE, Walldorf (DE)

(72) Inventors: Simon Heimler, Coswig (DE); Sebastian Wennemers, Mannheim (DE)

(73) Assignee: SAP SE, Walldorf (DE)

( * ) Notice: Subject to any disclaimer, the term of this patent is extended or adjusted under 35 U.S.C. 154(b) by 235 days.

(21) Appl. No.: 18/511,338

(22) Filed: Nov. 16, 2023

(65) Prior Publication Data

US 2025/0168253 A1 May 22, 2025

(51) Int. Cl.
*G06F 15/16* (2006.01)
*G06F 16/25* (2019.01)
*H04L 67/561* (2022.01)

(52) U.S. Cl.
CPC .......... *H04L 67/561* (2022.05); *G06F 16/252* (2019.01)

(58) Field of Classification Search
CPC .............................. G06F 16/252; H04L 67/561
USPC ......................................................... 709/246
See application file for complete search history.

(56) References Cited

U.S. PATENT DOCUMENTS

| | | | |
|---|---|---|---|
| 7,966,233 | B1 | 6/2011 | Khowash et al. |
| 10,915,378 | B1 | 2/2021 | Mary et al. |
| 12,323,485 | B1 | 6/2025 | Wennemers et al. |
| 2009/0024561 | A1 | 1/2009 | Palanisamy |
| 2017/0118098 | A1 | 4/2017 | Littlejohn et al. |
| 2019/0332374 | A1 | 10/2019 | Harner et al. |
| 2020/0201609 | A1 | 6/2020 | Schaus et al. |
| 2022/0021575 | A1 | 1/2022 | Wang et al. |
| 2022/0237212 | A1* | 7/2022 | Dixit ..................... G06F 16/288 |
| 2022/0405296 | A1* | 12/2022 | Buchmann ............ G06F 16/289 |
| 2022/0407924 | A1* | 12/2022 | Buchmann ............ G06F 16/211 |
| 2023/0090977 | A1 | 3/2023 | Houston |
| 2023/0176877 | A1 | 6/2023 | Heimler |
| 2023/0176931 | A1 | 6/2023 | Heimler et al. |
| 2025/0168226 | A1 | 5/2025 | Wennemers et al. |
| 2025/0267191 | A1 | 8/2025 | Wennemers et al. |

OTHER PUBLICATIONS

"Discovery Symbology API User Guide". May 2024. LSEG. Version 10. pp. 1-42. (Year: 2024).*

(Continued)

*Primary Examiner* — Imad Hussain
(74) *Attorney, Agent, or Firm* — Fish & Richardson P.C.

(57) ABSTRACT

The disclosure generally describes methods, software, and systems for open resource discovery protocol describing entity types. An identifier of a first entity type is received. The first entity type defines a relation between an application programming interface (API) and event information. A reference for the first entity type is generated based on the identifier of the first entity type. The reference links the first entity type to the API. A description of the first entity type is provided for storage using the reference for the first entity type. the description includes a structure of an underlying data model. A request to provide the first entity type based on the description of the first entity type is received. The first entity type is provided using an exposed API and the reference for the first entity type.

20 Claims, 7 Drawing Sheets

600

| RECEIVE ENTITY TYPE IDENTIFIER | 602 |
|---|---|

↓

| GENERATE REFERENCE FOR ENTITY TYPE | 604 |
|---|---|

↓

| GENERATE MAPPING FOR PROVIDE DESCRIPTION OF ENTITY TYPE | 606 |
|---|---|

↓

| PROVIDE DESCRIPTION OF ENTITY TYPE | 608 |
|---|---|

↓

| RECEIVE REQUEST FOR ENTITY TYPE | 610 |
|---|---|

↓

| PROVIDE ENTITY TYPE | 612 |
|---|---|

↓

| DERIVE DATA FLOW BASED ON MAPPING | 614 |
|---|---|

(56)                    References Cited

OTHER PUBLICATIONS

U.S. Appl. No. 18/511,363, Wennemers et al., Cross-Application
Protocol Describing Integration Dependencies, filed Nov. 16, 2023,
38 pages.
Final Office Action in U.S. Appl. No. 18/511,363, mailed on Dec.
31, 2024, 15 pages.
Non-Final Office Action in U.S. Appl. No. 18/511,363, mailed on
Aug. 29, 2024, 14 pages.

* cited by examiner

Figure 2:
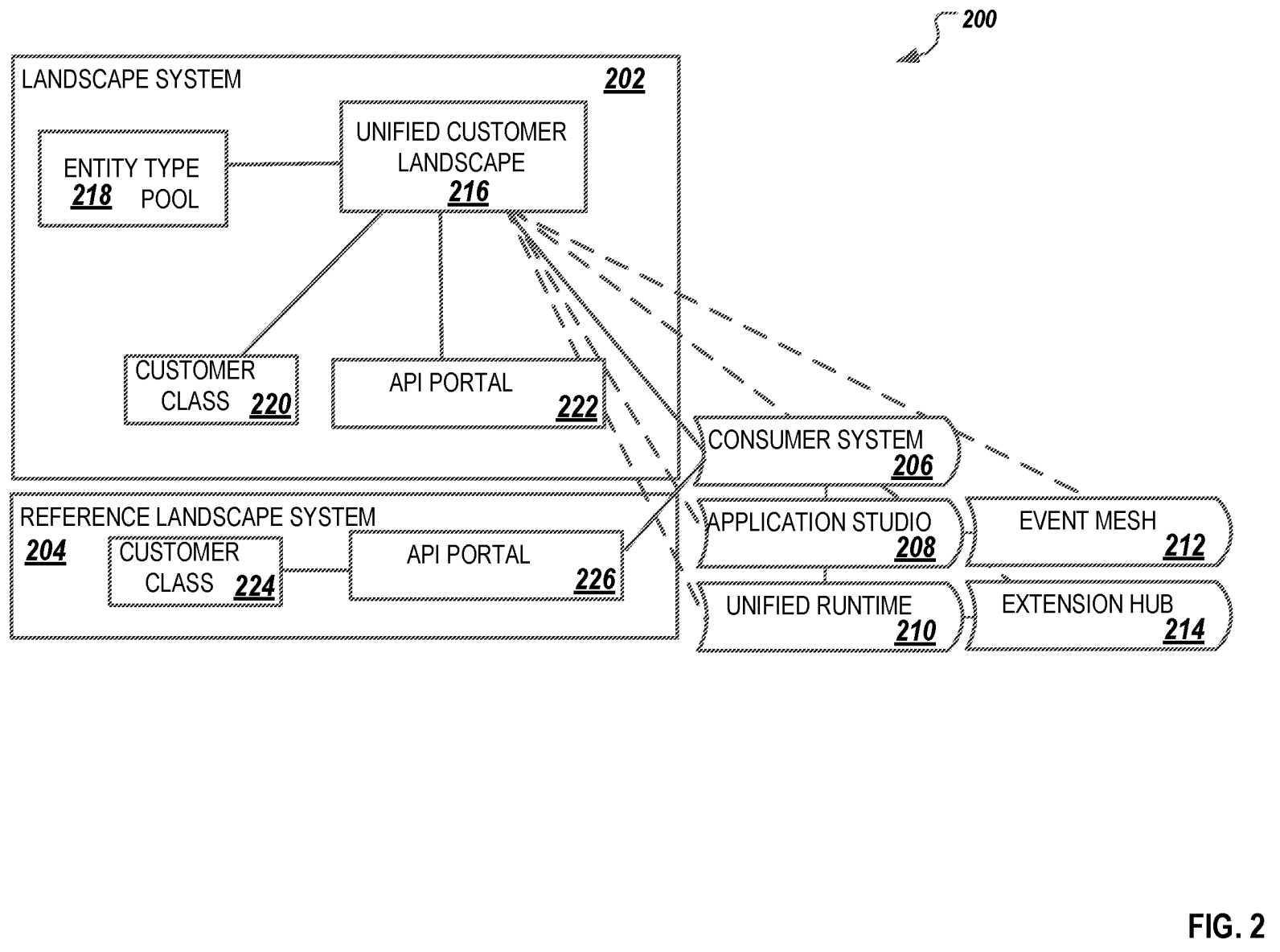

200

LANDSCAPE SYSTEM 202

UNIFIED CUSTOMER LANDSCAPE 216

ENTITY TYPE POOL 218

CUSTOMER CLASS 220

API PORTAL 222

REFERENCE LANDSCAPE SYSTEM 204

API PORTAL 226

CUSTOMER CLASS 224

CONSUMER SYSTEM 206

APPLICATION STUDIO 208

UNIFIED RUNTIME 210

EVENT MESH 212

EXTENSION HUB 214

| | |
|---|---|
| RECEIVE ENTITY TYPE IDENTIFIER | _602_ |
| GENERATE REFERENCE FOR ENTITY TYPE | _604_ |
| GENERATE MAPPING FOR PROVIDE DESCRIPTION OF ENTITY TYPE | _606_ |
| PROVIDE DESCRIPTION OF ENTITY TYPE | _608_ |
| RECEIVE REQUEST FOR ENTITY TYPE | _610_ |
| PROVIDE ENTITY TYPE | _612_ |
| DERIVE DATA FLOW BASED ON MAPPING | _614_ |

OPEN RESOURCE DISCOVERY OF ENTITY TYPES

TECHNICAL FIELD

The present disclosure relates to discovering application programming interfaces (APIs).

BACKGROUND

During an exploration phase, customers and internal software developers, generally search for a particular problem-domain, such as objects and/or entities. The problem-domains are not directly connected to technical artifacts, such as API or event resources. Relationships between problem-domains and technical artifacts can only be found by reading documentation or by consulting expert knowledge. In many cases, multiple technical artifacts can be identified as being associated with a particular problem-domain, but it might not be clear that some technical artifacts with different names and IDs correspond to the same (semantically wise) object.

SUMMARY

Implementations of the present disclosure are directed to techniques and tools for discovering, representing, and exposing various types of entities, including application programming interfaces (APIs) for bundling resources across different protocols. More particularly, implementations of the present disclosure are directed to an open resource discovery (ORD) protocol.

In some implementations, a method includes: receiving, by one or more processors, an identifier of a first entity type, the first entity type defining a relation between an application programming interface (API) and event information; generating, by the one or more processors, based on the identifier of the first entity type, a reference for the first entity type, the reference linking the first entity type to the API; providing, by the one or more processors, a description of the first entity type for storage using the reference for the first entity type, the description including a structure of an underlying data model; receiving, by the one or more processors, a request to provide the first entity type based on the description of the first entity type; and in response to the received request, providing, by the one or more processors, the first entity type using an exposed API and the reference for the first entity type.

The foregoing and other implementations can each optionally include one or more of the following features, alone or in combination. In particular, implementations can include all the following features:

In a first aspect, combinable with any of the previous aspects, the computer-implemented method further includes generating, by the one or more processors, a mapping of the first entity type to a second entity type. In another aspect, combinable with any of the previous aspects, the mapping includes information indicative of local data models that are supported by the first entity type and the second entity type. In another aspect, combinable with any of the previous aspects, the computer-implemented method further includes deriving, by the one or more processors, a data flow based on the mapping of the first entity type to the second entity type. In another aspect, combinable with any of the previous aspects, the first entity type includes a root entity and the second entity type includes a sub-entity. In another aspect, combinable with any of the previous aspects, the underlying data model is stored as metadata information. In another aspect, combinable with any of the previous aspects, the reference includes external files or locations. In another aspect, combinable with any of the previous aspects, the description includes properties of the first entity type and data types the first entity type.

Other implementations of the aspect include corresponding systems, apparatus, and computer programs, configured to perform the actions of the methods, encoded on computer storage devices.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the subject matter of the specification are set forth in the accompanying drawings and the description below. Other features, aspects, and advantages of the subject matter will become apparent from the description, the drawings, and the claims.

DESCRIPTION OF DRAWINGS

FIG. 2 is a block diagram of an example aggregation architecture, according to some implementations of the present disclosure.

Like reference numbers and designations in the various drawings indicate like elements.

DETAILED DESCRIPTION

Figure 1:
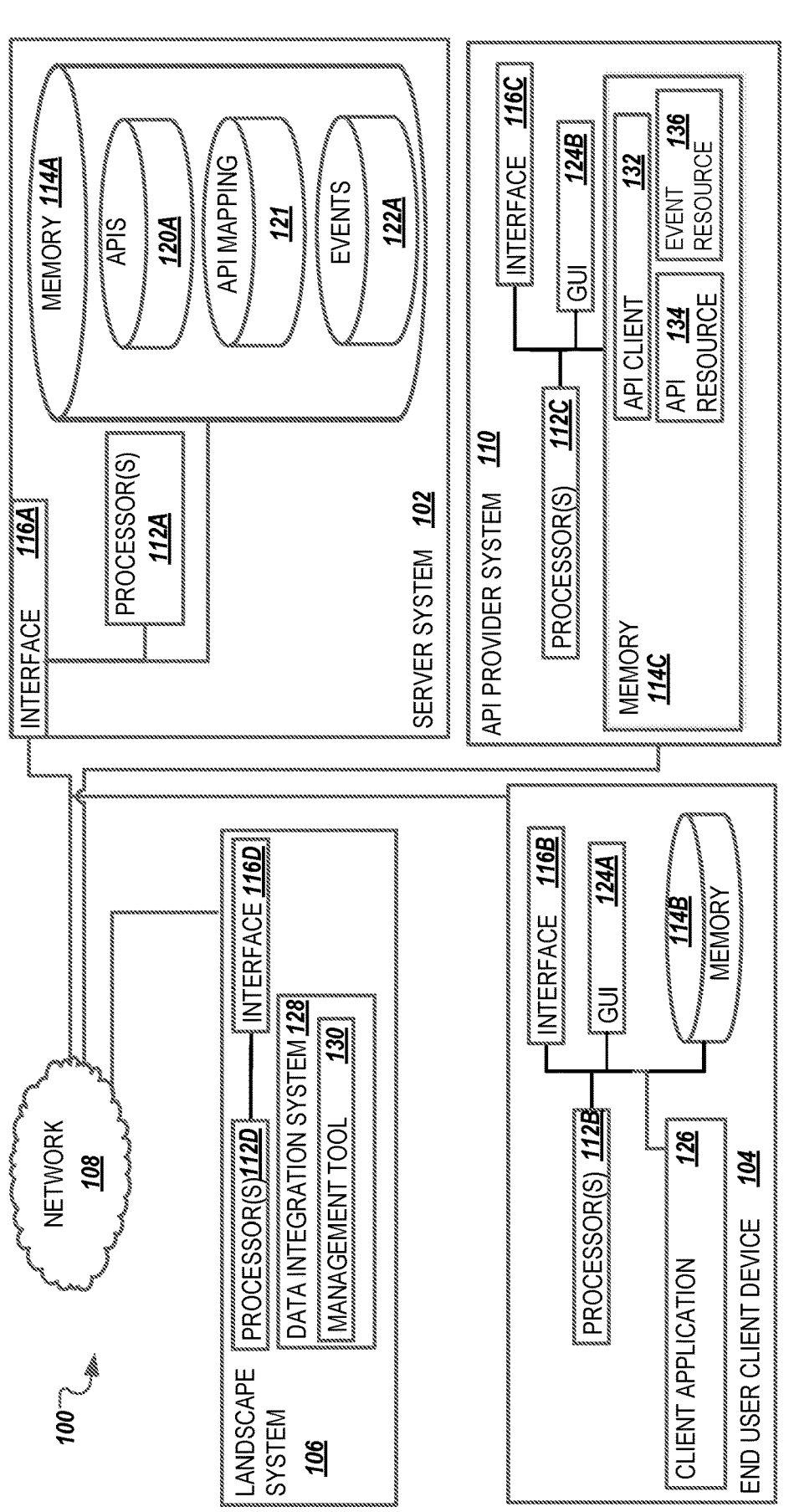
FIG. 1 is a block diagram of an example system that can be used to execute implementations of the present disclosure.

Implementations of the present disclosure are directed to techniques and tools for an open resource discovery (ORD)

protocol describing entity types. More particularly, implementations of the present disclosure are directed to providing a description of entity types, based on a mapping to an application programming interface (API) and event information. APIs can include, for example, programming interfaces (including events) that serve as the building blocks to support extensions and integrations from a computer application in a third-party system or language. Each source system that provides APIs may have different ways to expose the metadata associated with APIs and events. The metadata can define, for example, a library of available APIs and information about what each API does, how the API is called (and used), and what the expected results include. Information about APIs can be provided online, for example, as API libraries or catalogs. However, some systems may not have ways of exposing the metadata regarding their APIs. Without knowing which APIs and events are available from (or exposed by) a system, it can be difficult for software engineers, for example, to build extensions or integrations that use the APIs. Existing conventional approaches regarding publishing API metadata can rely on, for example, a) documentation b) custom API catalogs (for example, SAP's Gateway Catalog Service), and c) hypermedia APIs such as Open Data Protocol (OData). Moreover, conventional approaches may not scale easily or may make it difficult to build extensions and integrations in a heterogeneous landscape. Additionally, some tools (such as web integrated development environment (WebIDE), mobile software development kit (SDK), cloud platform integration, API management, and enterprise messaging, do not have standard ways to add a description of new entities (APIs and events), relating instead, to external identifiers and other protocols to fetch entity information.

Addressing the limitations of traditional protocols of retrieving entity type information, the addition of entity description protocol described in the present disclosure enables bundling of entity descriptions and automatic generation of corresponding data flow. The open resource discovery protocol described in the present disclosure provides an entity type taxonomy within a system. The entity type taxonomy can describe both a local perspective (including an application and/or a technical stack of entities with one or more sub entities) and a globally aligned perspective (provided by a central authority) at the same time without triggering a conflict with entities already existing in the system. For example, descriptions can be added as extensions to an existent system specification. The entity types can be standardized across system. For example, entities can be globally uniquely identified and referenced across product boundaries. The entities can be described up to a particular high-level detail. The entity description can express relationships to and from different other entities like APIs, events, capabilities and more. The entity description can provide a complete set of details about entities and entity types (e.g., composite structure, properties, data types, mapping, etc.) using machine readable resource definitions formats, such as JAVASCRIPT Object Notation (JSON) schema.

In some implementations, discovery of APIs and related connection information can be performed automatically by machine-driven processes, based on the provided standardized descriptions. For example, automated processes can process the entity descriptions to determine relationships (mapping) between APIs and connection information. In some implementations, API providers can provide or publish information about their APIs for inclusion in the API catalog. Machine-readable formats can include, for example, JSON. In some implementations, the API catalog can be implemented as a centralized portal. The centralized portal can allow users to connect to different APIs that may have various (including proprietary) communication protocols. In some implementations, the API catalog can provide aggregated information so that users can obtain access to the APIs that may not be exposable in other ways. For example, some APIs may be in languages that some users are not able to understand. In the described example, a common language is provided by the API catalog.

The open resource discovery protocol can provide the following advantages. The discovery and consumption of APIs can be faster than in convention systems in which many different protocols must be learned. Discovery by developer and machines can be supported. Developers can build client libraries and IDE plugins. API owners can more easily engage with and grow their API communities. API consumers can receive API and event definitions with information about the supported authentication and API lifecycle information (e.g., version, latest-version, software version, and deprecation policies). Public APIs can be exposed that do not require authentication to access resources. Taxonomy, interfaces, and services characteristics can be harmonized across various service providers. The harmonization can adhere to the representational state transfer (REST) harmonization guidelines from various groups.

FIG. 1 is a block diagram illustrating an example system 100 for an ORD protocol. Specifically, the illustrated example system 100 includes or is communicably coupled with a server system 102, an end-user client device 104, an API provider 110, landscape systems 106, and a network 108. Although shown separately, in some implementations, functionality of two or more systems or servers may be provided by a single system or server. In some implementations, the functionality of one illustrated system, server, or component may be provided by multiple systems, servers, or components, respectively.

In the example of FIG. 1, the server system 102 is intended to represent various forms of servers including, but not limited to a web server, an application server, a proxy server, a network server, and/or a server pool. In general, server systems 102 accept requests for application services and provides such services to any number of end-user client devices 104 (e.g., the client device 104 over the network 108). In accordance with implementations of the present disclosure, and as noted above, the server system 102 can host a solution environment that can be a cloud environment providing software applications, systems, and services that can be consumed by customers as a service. In some instances, the server system 102 can support configuring of various tenants of different types, as well as services of different types that are integrated in customer integration scenarios and support execution of defined processes. For example, the server system 102 includes a processor 112A, a memory 114A, and an interface 116A. The memory 114A can include APIs 120A, API mapping 121, and events 122A. The API mapping 121 in the memory 114A can include integration dependency documents defining aspects that point to resources (APIs and events) of API provider system(s) 110. The API mapping 121 provides references to external resources, which can be described by the integration target via open resource discovery (ORD). In some implementations, a dependency defined by API mapping 121 can also point to resources within a same system (e.g., if the resource is to be used by the integration target as an information backchannel and/or if it defines the contract for the integration target.

The end-user client device 104 and the API provider 110 may each be any computing device operable to connect to or communicate in the network(s) 108 using a wireline or wireless connection. In general, each of the end-user client device 104 and the API provider 110 includes an electronic computer device operable to receive, transmit, process, and store any appropriate data associated with the system 100 of FIG. 1. Each of the end-user client device 104 and the API provider 110 is generally intended to encompass any client computing device such as a laptop/notebook computer, wireless data port, smart phone, personal data assistant (PDA), tablet computing device, one or more processors within these devices, or any other suitable processing device. The client device 104 and the API provider 110 respectively include interface(s) 116B and 116C, processor(s) 112B and 112C, memories 114B and 114C, and graphical user interface(s) (GUIs) 124A and 124B. The end-user client device 104 can include one or more client applications 126. The client application 126 can be any type of application that allows a client device to request and view content on the client device (e.g., generate a request for synchronized customer data). In some implementations, a client application 126 can use parameters, metadata, and other API and event dependency information received at launch to access API mapping 121 from the server system 102. In some instances, a client application 126 may be an agent or client-side version of the one or more enterprise applications running on an enterprise server (not shown). The memory 114C of the target API provider system 110 can include an API client 132, API resources 134, and event resources 136 that can be used for integration dependency. For example, the end-user client device 104 and/or the API provider 110 may comprise a computer that includes an input device, such as a keypad, touch screen, or other device that can accept user information, and an output device that conveys information associated with the operation of the server system 102, or the client device itself, including digital data, visual information, or a GUI 124A, 124B, respectively. The GUI 124A, 124B each interface with at least a portion of the system 100 for any suitable purpose, including generating a visual representation of the client application 126 or the administrative application 133, respectively. In particular, the GUIs 124A, 124B may each be used to view and navigate various Web pages. Generally, the GUIs 124A, 124B each provide the user with an efficient and user-friendly presentation of application data provided by or communicated within the system. The GUIs 124A, 124B may each comprise a plurality of customizable frames or views having interactive fields, pull-down lists, and buttons operated by the user. The GUIs 124A, 124B each contemplate any suitable graphical user interface, such as a combination of a generic web browser, intelligent engine, and command line interface (CLI) that processes information and efficiently presents the results to the user visually.

The landscape systems 106 can include multiple systems that exist in a multi-system landscape. An organization can use different systems, of different types, to run the organization, for example. The landscape systems 106 can include systems from a same customer or different customers. The landscape systems 106 can each include at least one of an interface 116D, a processor 112D, and a data integration system 128. The data integration system 128 can include an integration management tool 130 to define integration capabilities. The integration capabilities include definitions of core (mandatory) dependencies and secondary (optional) dependencies, to express some APIs and events (capabilities) that can be alternatives to each other, to realize the integration outcome. The landscape management configuration tool 130 can filter the customer landscape to identify suitable integration targets, from multiple API provider systems 110, based on integration requirements and can automatically select an identified API provider systems 110 for establishing connections to any of the API client 132, API resources 134, and event resources 136 of a target API provider system 110, over the network 108.

In some implementations, the network 108 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems. Data exchanged over the network 108, is transferred using any number of network layer protocols, such as Internet Protocol (IP), Multiprotocol Label Switching (MPLS), Asynchronous Transfer Mode (ATM), Frame Relay, etc. Furthermore, in implementations where the network 108 represents a combination of multiple sub-networks, different network layer protocols are used at each of the underlying sub-networks. In some implementations, the network 108 represents one or more interconnected internetworks, such as the public Internet.

Each processor 112A, 112B, 112C, 112D included in the end-user client device 104 or the API provider 110 may be a central processing unit (CPU), an application specific integrated circuit (ASIC), a field-programmable gate array (FPGA), or another suitable component. Generally, each processor 112A, 112B, 112C, 112D included in the end-user client device 104 or the API provider 110 executes instructions and manipulates data to perform the operations of the end-user client device 104 or the API provider 110, respectively. Specifically, each processor 112A, 112B, 112C, 112D included in the end-user client device 104 or the API provider 110 executes the functionality required to send requests to the server system 102 and to receive and process responses from the server system 102. Each processor 112A, 112B, 112C, 112D may be a central processing unit (CPU), a blade, an application specific integrated circuit (ASIC), a field-programmable gate array (FPGA), or another suitable component. Each processor 112A, 112B, 112C, 112D executes instructions and manipulates data to perform the operations of the respective system (the server system 102, the end-user client device 104, the API provider 110, and the landscape systems 106). Specifically, each processor 112A, 112B, 112C, 112D executes the functionality required to receive and respond to requests from the respective system (the server system 102, the end-user client device 104, the API provider 110, and the landscape systems 106), for example.

Interfaces 150, 152, 153, and 154 are used by the server system 102, the end-user client device 104, the landscape system 106, and the API provider 110, respectively, for communicating with other systems in a distributed environment—including within the system 100—connected to the network 108. Generally, the interfaces 150, 152, 153, and 154 each comprise logic encoded in software and/or hardware in a suitable combination and operable to communicate with the network 108. More specifically, the interfaces 150, 152, 153, and 154 may each comprise software supporting one or more communication protocols associated with communications such that the network 108 or interface's hardware is operable to communicate physical signals within and outside of the illustrated system 100.

The memory 114A, 114B, 114C may include any type of memory or database module and may take the form of volatile and/or non-volatile memory including, without limitation, magnetic media, optical media, random access memory (RAM), read-only memory (ROM), removable media, or any other suitable local or remote memory component. The memory 114A, 114B, 114C may store various objects or data, including caches, classes, frameworks, applications, backup data, application objects, jobs, web pages, web page templates, database tables, database queries, repositories storing application data and/or dynamic information, and any other appropriate information including any parameters, variables, algorithms, instructions, rules, constraints, or references thereto associated with the purposes of the server system 102, the end-user client device 104, the API provider system 110, or the landscape system 106, respectively.

There may be any number of end-user client devices 104 and API provider systems 110 associated with, or external to, the system 100. Additionally, there may also be one or more additional client devices external to the illustrated portion of system 100 that are capable of interacting with the system 100 via the network(s) 108. Further, the term "client," "client device," and "user" may be used interchangeably as appropriate without departing from the scope of the disclosure. Moreover, while client device may be described in terms of being used by a single user, the disclosure contemplates that many users may use one computer, or that one user may use multiple computers. As used in the present disclosure, the term "computer" is intended to encompass any suitable processing device. For example, although FIG. 1 illustrates a single server system 102, a single end-user client device 104, a single API provider 110, the system 100 can be implemented using a single, stand-alone computing device, two or more servers 102, or multiple client devices. The server system 102, the end-user client device 104 and the API provider system 110 may include any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server system 102 and the end-user client device 104 and the API provider system 110 may be adapted to execute any operating system or runtime environment, including Linux, UNIX, Windows, Mac OS®, Java™, Android™, iOS, BSD (Berkeley Software Distribution) or any other suitable operating system. According to one implementation, the server system 102 may also include or be communicably coupled with an e-mail server, a Web server, a caching server, a streaming data server, and/or another suitable server.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, ABAP (Advanced Business Application Programming), ABAP OO (Object Oriented), any suitable version of 4GL, as well as others. While portions of the software illustrated in FIG. 1 are shown as individual modules that implement the various features and functionality through various objects, methods, or other processes, the software may instead include multiple sub-modules, third-party services, components, libraries, and such, as appropriate. Conversely, the features and functionality of various components can be combined into single components as appropriate.

In some implementations, the API provider systems 110 can expose their APIs in advance, with each of the APIs having a different language and a different communication protocol. The end user client device 104 can include various API consumption tools, for example, API management tools, visual studio (VS) and IOS (operating system) software development kits (SDKs), build tools, and web integrated development environment (WebIDE) tools. API provider systems 110 can include, for example, API portals, API management providers, gateways, and new entity integration tools. The communication between the end user client device 104 (as API consumers) and the API provider systems 110 can include several different communication protocols configured to optimized storage of and access to integrated new entities, as described in detail with reference to FIGS. 2-5.

FIG. 2 illustrates a block diagram of an example architecture 200. The example architecture 200 includes a landscape system 202, a reference landscape system 204, a consumer system 206, an application studio 208, a unified runtime system 210, an event mesh system 212, and an extension portal 214. The landscape system 202 includes a unified customer landscape 216, an entity type pool 218, a customer class 220, and an API portal 222. The reference landscape system 204 includes a customer class 224 and an API portal 226. The API portals 222, 226 can include a portal API and a catalog API, providing access to multiple packages, with multiple types of APIs (e.g., OData of different versions, representational state transfer (REST), simple object access protocol (SOAP), artifacts, proxies, and sandbox keys).

The example architecture 200 can be used to implement a protocol for decentralized metadata publishing and centralized discovery, by using the landscape system 202 as a central aggregator. The landscape system 202 can discover and combine ORD information and re-expose the combined information as a metadata view. The landscape system 202 can collect and aggregate decentralized information. The landscape system 202 can make aggregated information available to various consumers/use cases.

The ORD protocol of the landscape system 202 is used for automated publishing of aggregated information to the API portal 222 and making it available to consumer systems (e.g., the consumer system 206, the application studio 208, the unified runtime system 210, the event mesh system 212, and the extension portal 214). For example, the landscape system 202 can provide a description of system instances, based on data retrieved from the entity type pool 218, the customer class(es) 220 and the API portal 222, at runtime, and can be able to reflect tenant specific customizations and extensions (which a static catalog cannot). The description of system instances can be compared, by the consumer system 206, to reference descriptions of system instances, retrieved from the reference landscape system 204. In some implementations, other consumer systems (e.g., the application studio 208, the unified runtime system 210, the event mesh system 212, and the extension portal 214) can retrieve the aggregated information through a linked consumer system or directly from the landscape system 202.

Figure 3:
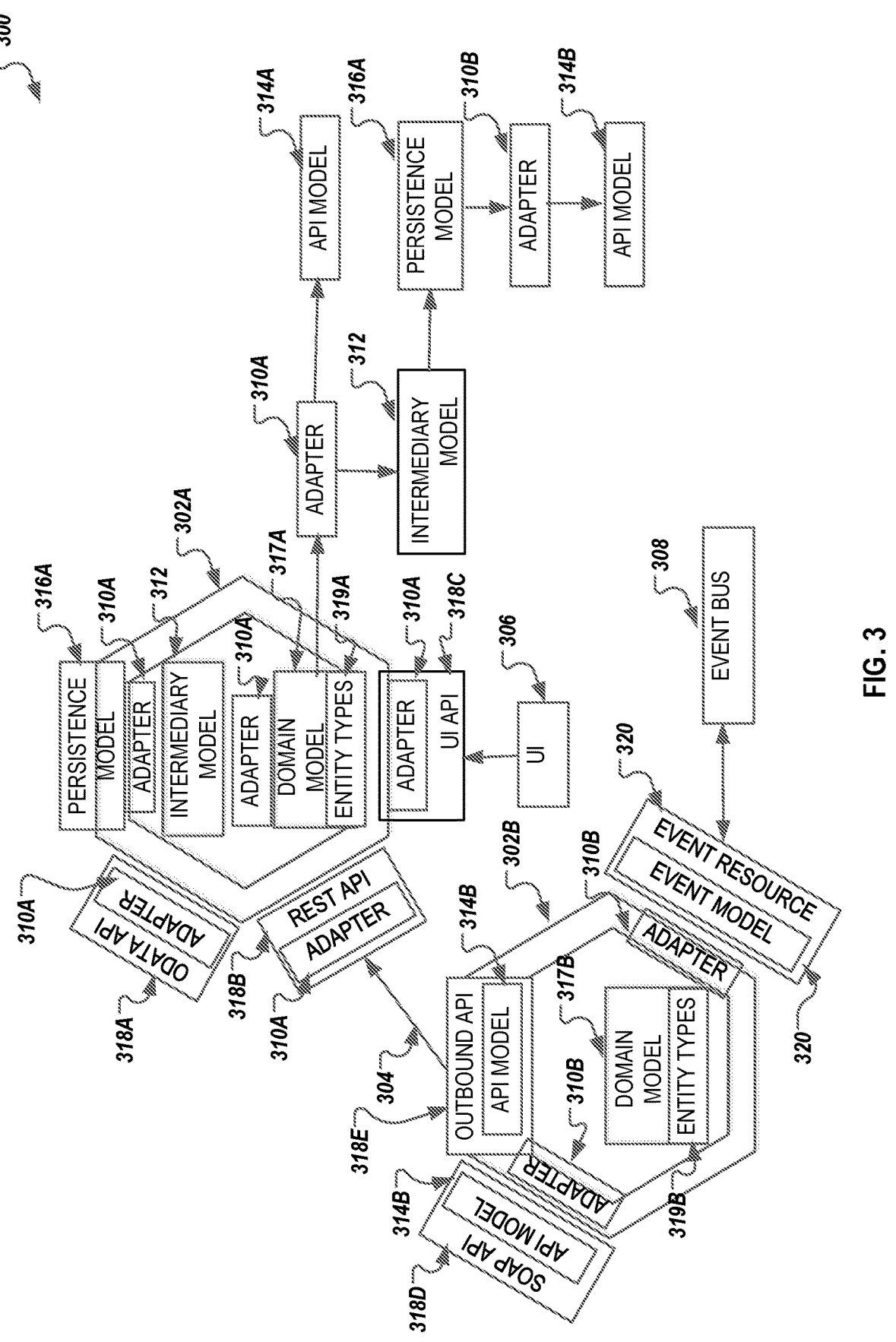
FIG. 3 is a block diagram of an example mapping, according to some implementations of the present disclosure.

FIG. 3 is a block diagram of an example of abstraction layer architecture 300. The abstraction layer architecture 300 includes multiple server systems 302A, 302B that include applications providing identified dependencies 304. The abstraction layer architecture 300 can further include a user interface (UI) 306, an event bus 308, an adapter 310A, an intermediary model 312, an API model 314A, a persistence model 316, an adapter 310B, and an API model 314B. Each server system 302A, 302B includes a domain model 317A, 317B, respectively, that can be an extensible model including respective entity types 319A, 319B.

As illustrated in the example of abstraction layer architecture 300, the server systems 302A, 302B can include multiple APIs 318, such as OData API 318A, REST API 318B, UI API 318C, SOAP API 318D, outbound API 318E and others. Each API 318 can include a respective adapter 310 and a respective API model 314. In addition to the APIs 318, the server system 302A can include a persistence model 316A connected to the domain model 317A using an adapter 310A. In addition to the APIs 318, the server system 302B can include an event resource 320, including an event model 322, connected to the domain model 317B using an adapter 310B.

The API models 314 can be concrete data models, which can be typically described via schemas (JSON Schema, XML Schema). The API models 314 can provide a description of the serialized data that is part of API responses and/or event instances. In integration use cases, an API model is integrated with one or more secondary API models based on integration dependencies 304. The API models 314 can provide schema models or (physical) data models.

The domain models 317A, 317B correspond to particular entity types 319A, 319B that represent an underlying abstraction behind the API models 314. The entity types 319A, 319B are driven by domain motivations. In a domain-driven design the domain models 317A, 317B include the server systems from a domain layer. One or more of the server systems 302A, 302B can include an intermediary (integration) model 312 that can be used as a basis for the respective API model 314A (e.g., semantic data models of applications). In some implementations, the intermediary (integration) model 312 can be explicitly defined (e.g., using entities of a cross-aligned domain model).

The aggregate can have different aggregation structures. The structure of the abstraction layer/model layer can depend on an application architecture and a requested type of metadata. Entity types 319A, 319B cannot be directly accessed as data, being conceptual/abstract data. If the data behind an entity type 319A, 319B is requested to be made available to an external system, to the requested entity type 319A, 319B can be exposed via APIs 314A, 314B or events, using the event bus 308. A single entity type 319A, 319B can be exposed multiple times via different APIs 314A, 314B or events, resulting in multiple API models 314A, 314B that can be based on the same entity type 319A, 319B. The mapping between an entity type 319A, 319B and an API model 314A, 314B can either be generic (ideally with a canonical, formally defined way to derive it) or handcrafted as custom mapping. Entity types 319A, 319B can be represented with different granularity levels. In domain-driven design, the aggregation can be adjusted according to the granularity levels of the integrated entities. Some entities are root entities which may contain further sub entities by composition. The complete "package" is then called an aggregate, which gets its name/identity from the root entity.

The abstraction layer architecture 300 can be designed to perform integration of entities according to application descriptions of the included entities and systems (e.g., domain models 317A, 317B). The application descriptions can include a categorization of entity types 319A, 319B into categories like root entities, sub entities, and aggregates. The abstraction layer architecture 300 can perform integration of entities according to the description of the granularity level of entity types 319A, 319B on aggregate level. The aggregate is the root entity including all its composite sub entities. It does not include entities that are referenced via associations. The entity type can be tagged as an "aggregate" and identified as an aggregate (or object). The abstraction layer architecture 300 can provide globally unique identifiers (ID) for each aggregate. The assignment of globally unique identifiers for each aggregate may be sufficient if there is no reason to reference the sub entities by their ID. In case the abstraction layer architecture 300 requires identification of sub entities, the sub entities can be described through abstraction layer architecture 300, making the sub entities addressable as well. In some implementations, the aggregate can include code lists referencing the included entities (and sub entities).

Figure 4:
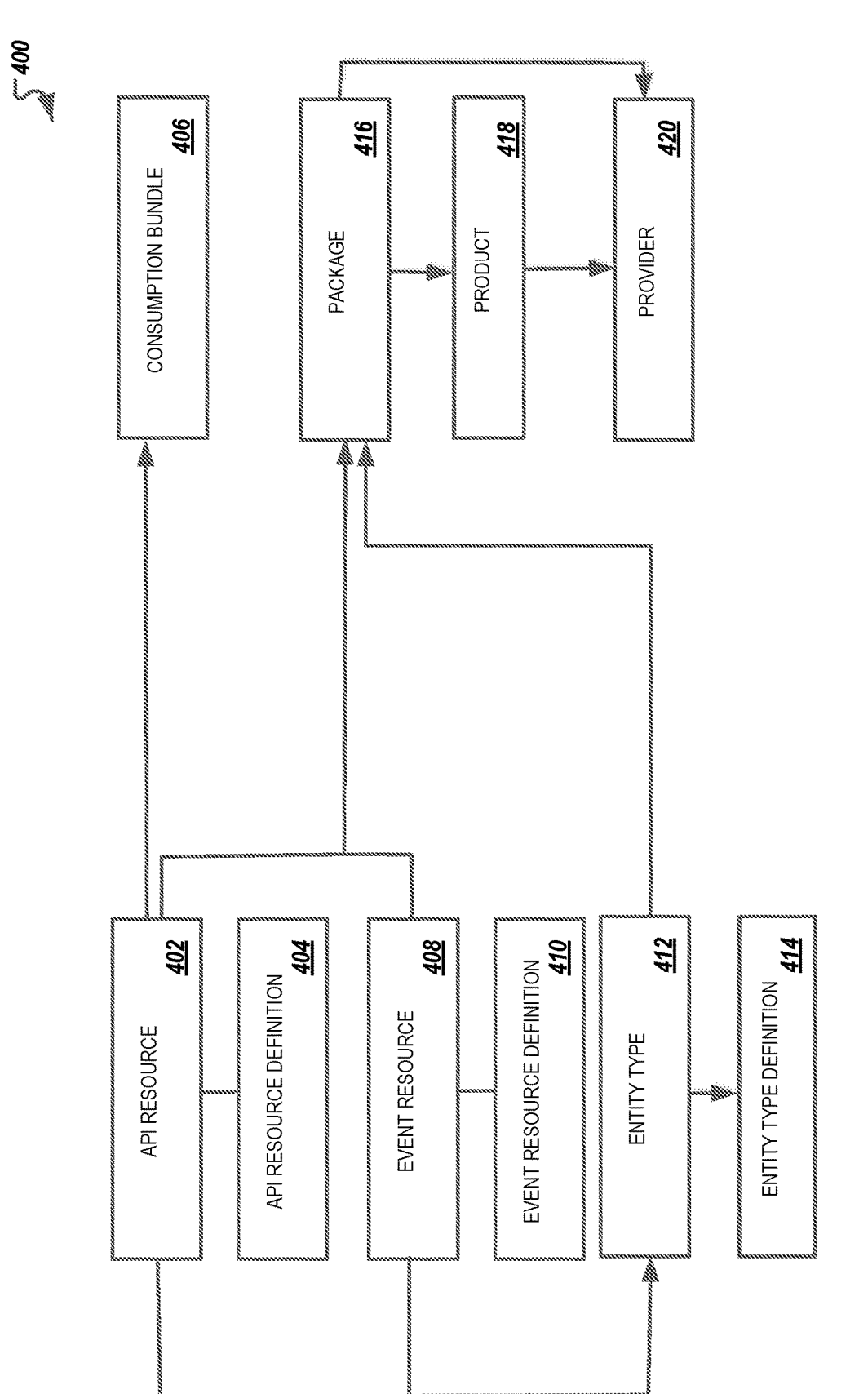
FIG. 4 is a block diagram showing an example of an architecture for open discovery API with an open resource discovery protocol, according to some implementations of the present disclosure.

FIG. 4 illustrates a block diagram of an example integration architecture 400 using a cross application ORD protocol. The example integration architecture 400 includes an API resource 402, an API resource definition 404, a consumption bundle 406, an event resource 408, an event resource definition 410, an entity type 412, an entity type definition 414, a package 416, a product 418, and a provider 420.

The example integration architecture 400 uses an ORD protocol that provides the entity type definition 414 including a description of an entity type 412 as ORD resource, such that the ORD type is fixed to an entity type. By adding the capability to describe entity types 412 in ORD, the applications and services can be defined as the system of record for entity type information. The entity type definition 414 can self-describe what entity types 412 are the conceptual foundation for their API and event models and more. In scope global ID concept for entity types 412 (also used for references), the high-level information about entity types 412 includes human readable titles, descriptions, release cycles, and other information types that can be provided to an API portal. The entity type definition 414 describing entity types 412 includes IDs (e.g., standardized and globally unique IDs) and namespace concepts that provide references to entity types 412. For example, the ID of the entity types 412 can be constructed as following:

<ordId>=<namespace>:<ordType>:<resourceId>:
  [v<majorVersion>]

The example integration architecture 400 use of IDs makes entity types 412 "addressable," as the ID can be used for references in external data sources as well. The IDs of the entity types 412 can be globally unique, providing references that are consistent and usable across application boundaries without conflicts, which is needed for our overall system landscape view. The namespace can be a part of the referential structure that provides global uniqueness. The namespace can indicate the ownership and the system of record for the information. The IDs of the entity types 412 can include references to autonomous systems that have their own local IDs and aligned namespaces. The namespace can reflect the ownership, indicating application/service specific namespaces. The namespace concept also includes a namespace fragment corresponding to the provider 420 to support customer/provider content. For example, the namespaces can be included in a global namespace registry or a distributed, hierarchical namespace registry (like DNS). In some implementations, the IDs of the entity types 412 can be aligned with the application/software IDs, which are a part of most namespaces and the registry. Some namespaces can indicate application ownership and some a shared ownership, defining a difference between the two variants. The actual name and variant of the namespace can be determined when registering it in a registry.

The entity types 412 can include multiple different categories (e.g., domain model, intermediary model, code list, etc.). In some implementations, categorizations of the entity types 412 can be determined by use cases. The entity type 412 can have a mandatory "level" property which can have the following three values: aggregate, root, and sub. The aggregate value refers to an aggregate including a root entity (which gives the aggregate its identity) and respective sub entities. The root value refers to a root entity, without implying its sub entities/structure. The sub entity does not have its own identity, being used as a sub structure of other entity types.

As illustrated in FIG. 4, the addition of the entity types 412 as new resources requires reflexive relations to the API resources 402, event resources 408, as well as relations to other resources and packages 416, most notably APIs, events, and capabilities. In some implementations, the addition of the entity types 412 triggers a determination of whether an entity type 412 can be mapped to other entity types 412. The mapping becomes particularly useful for shared, aligned API models that can be integrated as described with reference to FIG. 3. The addition of the entity types 412 also introduces mapping as an additional reflexive relation based on entity type similarity. Mappable means that it is principally possible to convert one instance of the original entity type to the target entity type. The conversion does not imply that every instance of the origin entity type is reasonably mappable to the target entity, but that for some cases the conversion is possible. ORD assumes that mappable relationships are described via self-description. Applications can describe mappable relations and support mapping of the local entity types to external or aligned entity types. The possibility to describe aligned/centralized data models can include mappings to local data models that have been considered and are supported. If the mapping is implemented in a middleware, the middleware itself can describe the resulting mapping/integration via ORD, within a bigger context (API/event resources, entity types).

The example integration architecture 400 provides integration of entity types 412 that cannot be directly accessed as data, as they are conceptual/abstract. If the data behind an entity type 412 is requested to be made available to a customer or a provider system 420, it needs to be exposed via API resources 402 or event resources 408. A single entity type 412 can be exposed multiple times via different APIs or events. The mapping between an entity type 412 and an API model can either be generic (e.g., with a canonical, formally defined way to derive it) or handcrafted as custom mapping. The challenge with the mapping from entity types 412 to APIs or API models is that the mapping can be done on different granularity level and in different places (ORD vs. resource definitions) using different options (seen as either complementary or substitutionary).

An option can include a simple relationship from API/event resource to entity type. The simplest relationship with the most coarse-grained granularity is to add the information indicating which entity types are related on API or event resource level. If an API covers many entity types, the information can become imprecise. An advantage of having this information would be in navigating/finding APIs and events related to a certain entity type. The API resources 402 can consist of any number of API operations, which can make use of any number of API models (which can be reused by multiple operations). The relationship to entity types 412 is not on API Resource 402 level, but on API Model level. The relationship to entity types can be used in the context of system compliance requirements to express the link of cross-aligned entity types) and an API. The relationship can be named using a term that can be found through mapping based on the entity types and/or mapping of API models relative to API model statuses (e.g., "exposed through," "realized," or "implemented").

The relationship from API model to entity type 412 provides an insight how the concepts relate and potentially provides more guidance/automation when it comes to integration mapping. It also comes with significant effort and is only realistically provided and maintained if the information is generated or derived from existing models/metadata good tooling support/UIs are offered. The approach puts the information on the mapping on the ORD level and adds a more sophisticated mapping construct to API resources 402 and event resources 408. Since every resource definition format represents API models differently, the "selectors" defining how this is done vary depending on the used protocol/resource definition formats. By adding the information to ORD level, it can be avoided having to extend the original resource definition formats with entity type mapping annotations. The mapping information can be stored in a different document than the detailed resource definition formats it refers to. The storage locations provide the tradeoff that the described approach makes and the main distinction to the upcoming approach. For example, an OData API can be described via an event resource 410 definition. Additionally, the ORD API resource 402 can add an entity type mapping which is a more complex structure which allows to freely select API models (for Odata they are selected by entity set names) and the entity types. The information that is provided within the entity type mapping is not redundant and not included in the API resource definition, which only describes the API model and does not know about the underlying conceptual entities (entity type 412). The relations are described within the protocol in a way that is technology/resource definition independent.

Another option can include a relationship from an API model to entity type in resource definition, which can have the same granularity as the second approach but adds the information on resource definition level. The resource definition-based API model to entity type relationship can add vocabulary extensions to OData EDMX and OpenAPI, covering the two most relevant standards for APIs. ORD allows using the described approach to express the link of an API to the corresponding entity type. An advantage of the described approach is that it makes the resource definition formats more self-contained and that it avoids a more complex mapping construct like in the previous approach. The resource definition-based API model to entity type relationship can use the concept of ORD entity types as defined by an architecture concept document. The additional property can be added to a JSON schema standard, as it can be reused between open API and event catalog documents. The resource definition-based API model to entity type relationship can partially address the disadvantage mentioned above, in that each resource definition is handled differently. In addition, a vocabulary extension for OData and other relevant resource definition formats can be used to optimize the mapping capability. For expressing additional qualities like mapping coverage, a property complex can be used.

The example integration architecture 400 can integrate generic capabilities of a system that rely on generic relations between the entities in the package (aggregate) 416. A generic relation concept can be used to describe arbitrary relationships between any kind of ORD concept. The type of such a relationship expresses its definition. The generic relation concept can include semantic triples, which consist of subject, predicate, and object. The subject can include the ORD concept where the relation is placed. The predicate can include the (custom) type, including a namespace that indicates the ownership of the definition of what the relation means (its semantic). The object can include the relation target, ideally another ORD resource that is referenced through an ORD ID.

Within the example integration architecture 400, an entity type 412 can be defined based on an aggregate level. The aggregate level-based definition implies that any inner details (including its inner structure, sub entities, data types etc.) of the entity type 412 are not described. A resource definition format can be used. The aggregate level-based definition can have different formats (e.g., a JSON Schema) or can be formatted according to standard options. It can be noted that if the conceptual models represent (internal) domain models, the exposure of internal domain models can be prevented to avoid that external parties rely on internal models as a contract. In many architectural styles (e.g., DDD, hexagonal architecture), the internal domain model can be decoupled from the API models on purpose, so it can be changed without breaking an external contract.

In some implementations, the entity types 412 can use a resource definition, which points to definition files, which describe the entity type in more detail, with the use of a dedicated standard of a logical model. A logical model file can include a document entity type 412 and its sub entities. A logical model file can include a boundary defining the associations. The individual entities can be referenced (e.g., by name in a core data service file) and the entity resource definitions can be queried. The example integration architecture 400 can query directly from the application, without a caching layer and eventual consistency. The accesses can be provided by an array pointing to an access strategy: unified customer landscape entity type support.

The integration architecture 400 provides an improvement over the conventional consumer/provider architecture because it facilitates the integration of new entity types. The addition of entity types 412 into the example integration architecture 400 implies explicit support for the new resource type by the aggregators, most notably unified customer landscape (UCL). The aggregator can process the new information (addition of entity types 412) and can store the new information (and the referenced resource definitions) in their persistence layer. The information can be exposed again to consumers via a UCL Discovery API, which means extending it with new resources/endpoints. Since entity types 412 are conceptually similar to API resources 402 and event resources 408, the addition can include an additional query support to navigate the new relations.

The integration architecture 400 provides a communication protocol (e.g., an additional query support) that optimizes navigation to the new relations with the new entity type 412 within the package 416, providing an improvement over traditional communication protocols. The integration architecture 400 also allows third-party consumers to discover new entity types in packages 416. The integration architecture 400 also facilitates access to sub entities.

The integration architecture 400 can allow users (or other API consumers) to search for, select, and implement APIs that are available from API providers 420. For example, the integration architecture 400 can generate a consumption bundle 406 based on entity type definitions 414. A search feature, for example, can allow users to search for API packages, APIs, and events, such as by name or type. A discover feature, for example, can allow a user to list and filter packages, APIs, and events (for example, cloud events) in various ways. An explore feature, for example, can allow a user to find API definitions 404 (for example, Open API Standard (OAS), Entity Data Model Designer (EDMD) for Edmx files, Web Services Description Language (WSDL), API testing and example data sets, and even definitions (for example AsyncAPI). The explore feature can make use of information from packages 416 that group API resources 402 by various features. Packages 416 can be used to group APIs by tag, for example, by API type. Tags can include, for example, product, industry, and country. The explore feature can allow users to search for APIs using keywords, filter results, and drill down to specific information for a given API. The consumption bundle 406, for example, can allow a user to access entity definitions and corresponding resources (API resources 402 and event resources 408).

In some implementations, the example integration architecture 400 can support discovery of (new) entity types in a cloud or in non-cloud networks. The example integration architecture 400 can provide an open discoverable format used by API consumers to discover and use different kinds of APIs. Discovery can occur using the open discoverable format (for example, through a central repository), and subsequent use of the APIs can occur using the formats and communication protocols that are provided by the example integration architecture 400. For example, the APIs of the different API providers can be exposed (for example, in a UI) in a common format that is easily digested by the user. Selection of an API by the user can cause an automatic import of the API-specific or API-proprietary format into the user's current context. For example, importing the API-specific or API-proprietary format can cause an addition to the user's application code, where the addition is a call to the API with the corresponding input and output parameters coded in the API-specific or API-proprietary format. Further, the security mechanisms that are needed to connect to the API can automatically be completed in the user's code. Security mechanisms can include, for example, API meta information such as security definitions and external links. Using the security mechanisms, the open API format aspects of the example integration architecture 400 can initially serve as a bridge for the user, after which connections occur directly to the APIs of the API providers. After an initial handshake is accomplished using the connections, for example, the open API format can be skipped.

The example integration architecture 400 includes API/event consumers that can use a discovery portal/catalog for access to API/event providers 420. Discovery by the API/event consumers that uses the discovery portal/catalog can include, for example, discovery of APIs and events published by provider system 420 or by customers. The discovery also relies on published APIs and events published by the API/event providers 420. After discovery, API/event consumers can access the API/event providers 420 directly. Discovery by the API/event consumers can also include direct discovery using APIs and events published by the API/event providers 420. Components of the API/event consumers, the discovery portal/catalog, and the API/event providers 420 include open discovery API components that provide the open API capabilities. The API/event consumers can include, for example, WebIDE tools, mobile SDK assistant tools, integration suite tools, customer third-party tools or applications. The discovery portal/catalog can include, for example, an API portal and customers' portals.

The API/event providers 420 can include, for example, cloud solutions, re-use services, integration suites, and customer/third-party APIs and events.

Figure 5:
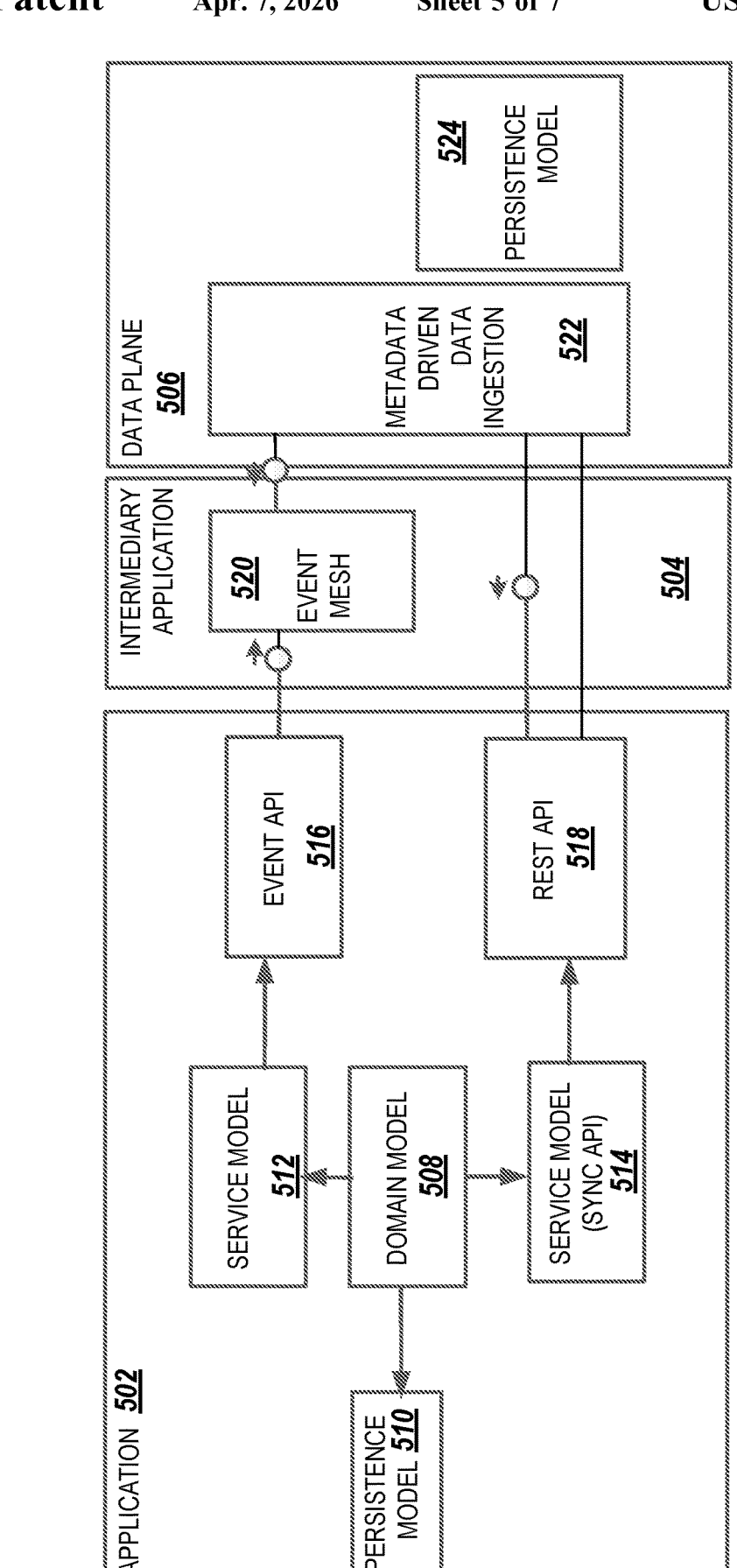
FIG. 5 is a block diagram showing an application integrating with a service, according to some implementations of the present disclosure.

FIG. 5 is a block diagram showing a schematic example an application integration 500. The example application integration 500 illustrates a schema for automatic integration based on meta data mapping to existing entities (e.g., APIs, events, data products, configuration, etc.). The example application integration 500 can include an application 502, an intermediary application 504, and a data plane 506. The application 502 links multiple model types to different API types. For example, the application 502 can link a domain model 508 to a persistence model 510 and one or more service model(s) 512, 514 that can be connected to event API(s) 516, 518. The intermediary application 504 can connect the event API 516 to an event mesh 520. The data plane 506 can include a metadata driven data ingestion 522 and a persistence model 524.

The example application integration 500 can include a common identifier scheme including a corresponding entity type. The entity type can be defined by the entity name. The entity names can be aligned with objects that are governed by a governance board defining object types. To interconnect existing application APIs 516, 518. The example application integration 500 can be configured to use applications 502 that make the APIs compliant with a set format. The application 502 can identify an instance of an entity and can link the API 516, 518 to the corresponding entity type. The entities are centrally managed and exposed as entity types to be consumed by API portal and other consumers. The link between an API 516, 518 and an entity (described as ORD entity type) can be expressed as described with reference to FIG. 3.

The data plane 506 can be used to provide a description of the API model behind data ingestion from API and event channels, and a mapping between the respective API and event physical models with their persistence model. The API model does not know about the underlying conceptual model. The example application integration 500 can expose a logical data model, which includes the respective metadata 522. The exposed logical data model can indirectly describe the physical models, as a logical model, wherein the translation into physical models can be inferred by a canonical mapping. In some implementations, the example application integration 500 can include an extended JSON Schema vocabulary which can transport the missing metadata information from the underlying logical model along with the physical model.

The example application integration 500 can include an exposure service that has a partial overlap with the entity type proposal but can be seen as a complementary approach in many aspects. The differences between the exposure service and the entity type concept are the following: the exposure focuses on the resource definition format only. The exposure is focused on complete entity descriptions (e.g., full structure, with attributes). The exposure corresponds to the concept of entity type resource definitions, which are just referenced from ORD as external files or locations. The entity types are much more high-level and do not cover the details that are covered by the entity type resource definitions. The core data service file supports advanced features that a simple metadata replication does not, most notable query and search support directly on the metadata provider, localization support, etc. The exposure does not have an aggregator/replication concept. The metadata can be fetched via point-to-point integrations directly from the connected system, without an intermediary. The exposure can represent an application local perspective, which may be local or global.

The example application integration 500 can include a reference to a location of an entity and a mapped description of a respective resource. The mapping from API models to exposure models can be done within the example application integration 500 via a dedicated mapping. The mapping defines a relationship from API model to entity type using a local ID concept that is different per application 502. In some implementations, ORD entity types cannot replace an exposure service that support advanced use cases and scenarios needed for integration. The ORD entity types can be used on top if there are use cases benefitting from it. The description of the entity types in ORD can be standardized, globally unique IDs and a simpler high-level description that is available in a central big picture service can be used via replication. Different concepts like APIs, events, and capabilities can be connected according to entity type relations. Entity types can be described via the exposure service that refer to the entity definition as an entity type resource definition. The exposure API can be embedded in a JSON/XML payload structure of an OData API response.

Figure 6:
FIG. 6 is a flowchart of an example process for integration dependencies, according to some implementations of the present disclosure.

FIG. 6 is a flowchart of an example process 600 for providing integration of new entity types. Example process 600 can be performed by any component of the example system 100, described with reference to FIG. 1. For clarity of presentation, the description that follows generally describes example process 600 in the context of FIGS. 1-5.

At 602, an identifier of a first entity type is received. The first entity type defines a relation between an application programming interface (API) and event information. For example, the first entity type can be associated to an API resource described using a particular API resource definition and/or can be associated to an event resource described using a particular event resource definition. The first entity type can include a root entity or a sub-entity. The entity types can include conceptual models related to ontology concepts and/or classes. API and event information can be received from API providers. The API and event information for each API provider is received in a format specific to the API provider. For example, the open API system can receive API information and event information from an API provider, as described with reference to FIG. 1. In some implementations, receiving the API and event information from an API provider can include receiving the API and event information directly from the API provider. In some implementations, receiving the API and event information from an API provider comprises mechanically discovering the API and event information at a source associated with the API provider.

At 604, a reference for the first entity type is generated. The reference links the first entity type to the API. The reference includes external files or locations.

At 606, a mapping of the first entity type to a second entity type is generated. The mapping includes information indicative of local data models that are supported by the first entity type and the second entity type. The second entity type can include a root entity or a sub-entity.

At 608, a description of the first entity type is provided for storage using the reference for the first entity type. The description includes a structure of an underlying data model. The underlying data model is stored as metadata information. The description includes properties of the first entity type and data types the first entity type. For example, a system can place its public APIs in a folder (for example, a Github folder) for mapping public Github APIs. The Github folder can be mapped to packages. APIs can then be read from the Github folders and grouped accordingly.

At 610, a request to provide the first entity type based on the description of the first entity type is received.

At 612, in response to the received request, the first entity type is provided using an exposed API and the reference to the first entity type. For example, the first entity type, can be provided using an API portal that can feature an integrated explorer that enables navigation between entities corresponding to different entity type pages. In some implementations, first entity type, can be provided using open discovery APIs that provide a language implementation that supports discovery of the first entity type as API components. The open discovery APIs can use an open discovery aggregator that accesses an API, events, and metadata cache. The conventional API components include success factors APIs, enterprise resource planning (ERP) APIs, Concur APIs, implementation APIs and other APIs. Success factors APIs can include OData APIs with tags. ERP APIs can use a gateway OData catalog. Concur APIs can include GitHub APIs (for example, including folders and open API specification files). Implementation APIs can include open discover API specification implementation information. The API components can define the mandatory and optional parameters for each of the APIs. The API components also provide human-readable information and definitions for each API including, for example, a names/titles, a description, ratings, terms of use, and links. The mapping between an open discovery service layer and a native API implementation can depend on the target system. For example, the mapping can follow multiple steps, based on a target system. First, a system can expose its API information using metadata that is annotated with tags and secondary tags. For example, primary tags can be used to identify packages. The APIs can be grouped based on the primary tags and bundled within the API packages. Secondary tags can be used to identify the associated APIs within a given leading entity (for example, parent entity to child entity). The information can be used to generate the required metadata for the APIs. For the open APIs, the cloud-based system can expose its own internal catalog to expose APIs and events.

At 614, a data flow is derived based on the mapping of the first entity type to the second entity type. The data flow can be derived by invoking mapped entities (e.g., a root entity and one or more related sub-entities) and running functions of the invoking mapped entities. In consumer client implementations, since the open discovery API specification and the linked APIs definitions are machine readable (for example, in JSON/or Yet another markup language (YAML) format), the code generation can connect to the selected APIs to generate the data flow. First, a Hyper Text Transfer Protocol (HTTP) client can be dynamically created to connect to the uniform resource locator (URL) specified in entryPoints->URL. Second, the API definitions end can be invoked to APIDefinitions->URL to obtain the corresponding OpenAPI files. The files can be parsed to obtain information for the Resources, expected request payload, and response payloads.

In some implementations, the example process 600 further includes steps for providing a catalog of the APIs to a user. For example, an open API format catalog can be provided for presentation to a user, such as in a user interface. Commands to search, discover, explore, and consume the open API format version of the API and event information can be receiving, from the user. The open API format version of the API and event information can be provided responsive to the commands. In some implementations, example process 600 further includes automatically incorporating, into computer code controlled by the user, code implementing a call to user-selected API and event information, wherein the incorporated code is in the format specific to the API provider. For example, the system can automatically embed API calls in source code being developed by and under the control of the user. In some implementations, example process 600 further includes representing, using packages, the open API format version of the API and event information. For example, the user can view open API information in package form. In some implementations, example process 600 further includes representing information associated with aggregate ratings, provider, tags, and actions as components accessible to the packages.

Figure 7:
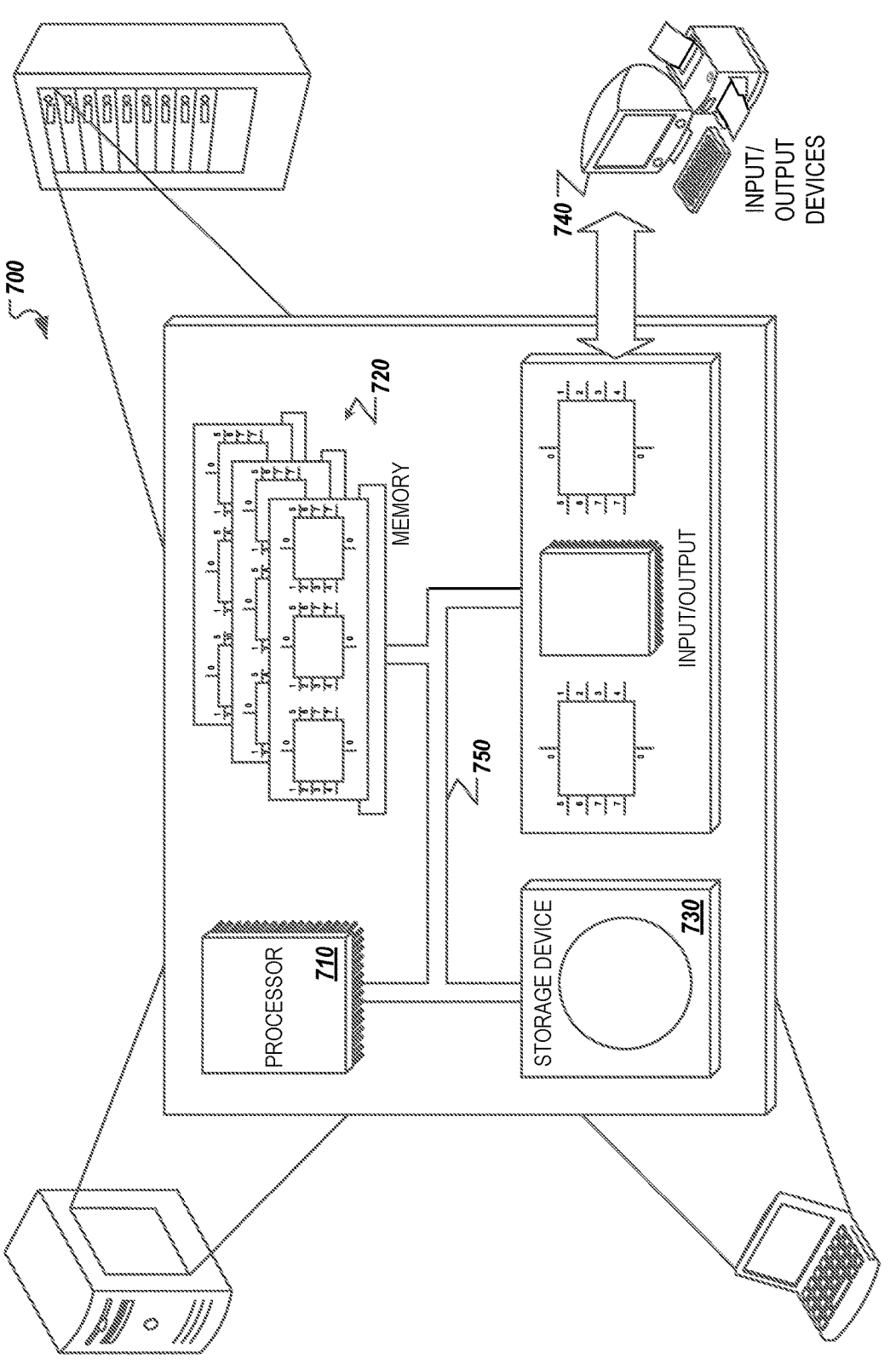
FIG. 7 is a block diagram of an exemplary computer system used to provide computational functionalities associated with described algorithms, methods, functions, processes, flows, and procedures as described in the instant disclosure.

FIG. 7 depicts a block diagram illustrating a computing system 700, in accordance with some example embodiments. Referring to FIG. 1, the computing system 700 can be used to implement the data integration system 128, other components of the example system 100 and/or any components of the example landscape system 200, described with reference to FIGS. 1 and 2.

As shown in FIG. 7, the computing system 700 can include a processor 710, a memory 720, a storage device 730, and input/output devices 740. The processor 710, the memory 720, the storage device 730, and the input/output devices 740 can be interconnected using a system bus 750. The processor 710 is capable of processing instructions for execution within the computing system 700. Such executed instructions can implement one or more components of, for example, the example system 100, described with reference to FIG. 1. In some implementations of the current subject matter, the processor 710 can be a single-threaded processor. Alternately, the processor 710 can be a multi-threaded processor. The processor 710 is capable of processing instructions stored in the memory 720 and/or on the storage device 730 to display graphical information for a user interface provided using the input/output device 740.

The memory 720 is a computer readable medium such as volatile or non-volatile that stores information within the computing system 700. The memory 720 can store data structures representing configuration object databases, for example. The storage device 730 is capable of providing persistent storage for the computing system 700. The storage device 730 can be a floppy disk device, a hard disk device, an optical disk device, or a tape device, or other suitable persistent storage means. The input/output device 740 provides input/output operations for the computing system 700. In some implementations of the current subject matter, the input/output device 740 includes a keyboard and/or pointing device. In various implementations, the input/output device 740 includes a display unit for displaying graphical user interfaces.

According to some implementations of the current subject matter, the input/output device 740 can provide input/output operations for a network device. For example, the input/output device 740 can include Ethernet ports or other networking ports to communicate with one or more wired and/or wireless networks (e.g., a local area network (LAN), a wide area network (WAN), the Internet).

In some implementations of the current subject matter, the computing system 700 can be used to execute various interactive computer software applications that can be used for organization, analysis and/or storage of data in various (e.g., tabular) format (e.g., Microsoft Excel®, and/or any other type of software). Alternatively, the computing system 700 can be used to execute any type of software applications. These applications can be used to perform various functionalities, e.g., planning functionalities (e.g., generating, managing, editing of spreadsheet documents, word processing documents, and/or any other objects), computing functionalities, or communications functionalities. The applications can include various add-in functionalities (e.g., SAP Integrated Business Planning add-in for Microsoft Excel as part of the SAP Business Suite, as provided by SAP SE, Walldorf, Germany) or can be standalone computing products and/or functionalities. Upon activation within the applications, the functionalities can be used to generate the user interface provided using the input/output device 740. The user interface can be generated and presented to a user by the computing system 700 (e.g., on a computer screen monitor).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random-access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The preceding figures and accompanying description illustrate example processes and computer implementable techniques. The environments and systems described above (or their software or other components) may contemplate using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, processes may have additional operations, fewer operations, and/or different operations, so long as the methods remain appropriate.

In other words, although the disclosure has been described in terms of certain implementations and generally associated methods, alterations and permutations of these implementations, and methods will be apparent to those skilled in the art. Accordingly, the above description of example implementations does not define or constrain the disclosure. Other changes, substitutions, and alterations are also possible without departing from the spirit and scope of the disclosure.

A number of implementations of the present disclosure have been described. Nevertheless, it will be understood that various modifications may be made without departing from the spirit and scope of the present disclosure. Accordingly, other implementations are within the scope of the following claims.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application.

Example 1. A computer-implemented method comprising: receiving, by one or more processors, an identifier of a first entity type, the first entity type defining a relation between an application programming interface (API) and event information; generating, by the one or more processors, based on the identifier of the first entity type, a reference for the first entity type, the reference linking the first entity type to the API; providing, by the one or more processors, a description of the first entity type for storage using the reference for the first entity type, the description comprising a structure of an underlying data model; receiving, by the one or more processors, a request to provide the first entity type based on the description of the first entity type; and in response to the received request, providing, by the one or more processors, the first entity type using an exposed API and the reference for the first entity type.

Example 2. The computer-implemented method of example 1, further comprising: generating, by the one or more processors, a mapping of the first entity type to a second entity type.

Example 3. The computer-implemented method of any of the preceding examples, wherein the mapping comprises information indicative of local data models that are supported by the first entity type and the second entity type.

Example 4. The computer-implemented method of any of the preceding examples, further comprising: deriving, by the one or more processors, a data flow based on the mapping of the first entity type to the second entity type.

Example 5. The computer-implemented method of any of the preceding examples, wherein the first entity type comprises a root entity and the second entity type comprises a sub-entity.

Example 6. The computer-implemented method of any of the preceding examples, wherein the underlying data model is stored as metadata information.

Example 7. The computer-implemented method of any of the preceding examples, wherein the reference comprises external files or locations.

Example 8. The computer-implemented method of any of the preceding examples, wherein the description comprises properties of the first entity type and data types the first entity type.

Example 9. A computer-implemented system comprising: memory storing application programming interface (API) information; and a server performing operations comprising: receiving an identifier of a first entity type, the first entity type defining a relation between an application programming interface (API) and event information; generating based on the identifier of the first entity type, a reference for the first entity type, the reference linking the first entity type to the API; providing a description of the first entity type for storage using the reference for the first entity type, the description comprising a structure of an underlying data model; receiving a request to provide the first entity type based on the description of the first entity type; and in response to the received request, providing the first entity type using an exposed API and the reference for the first entity type.

Example 10. The computer-implemented system of example 9, wherein the operations further comprise: generating a mapping of the first entity type to a second entity type.

Example 11. The computer-implemented system of any of the preceding examples, wherein the mapping comprises information indicative of local data models that are supported by the first entity type and the second entity type.

Example 12. The computer-implemented system of any of the preceding examples, wherein the operations further comprise:

deriving a data flow based on the mapping of the first entity type to the second entity type.

Example 13. The computer-implemented system of any of the preceding examples, wherein the first entity type comprises a root entity and the second entity type comprises a sub-entity.

Example 14. The computer-implemented system of any of the preceding examples, wherein the underlying data model is stored as metadata information.

Example 15. The computer-implemented system of any of the preceding examples, wherein the reference comprises external files or locations.

Example 16. The computer-implemented system of any of the preceding examples, wherein the description comprises properties of the first entity type and data types the first entity type.

Example 17. A non-transitory computer-readable media encoded with a computer program, the computer program comprising instructions that when executed by one or more computers cause the one or more computers to perform operations comprising: receiving an identifier of a first entity type, the first entity type defining a relation between an application programming interface (API) and event information; generating based on the identifier of the first entity type, a reference for the first entity type, the reference linking the first entity type to the API; providing a description of the first entity type for storage using the reference for the first entity type, the description comprising a structure of an underlying data model; receiving a request to provide the first entity type based on the description of the first entity type; and in response to the received request, providing the first entity type using an exposed API and the reference for the first entity type.

Example 18. The non-transitory computer-readable media of example 17, wherein the operations further comprise: generating a mapping of the first entity type to a second entity type, wherein the mapping comprises information indicative of local data models that are supported by the first entity type and the second entity type.

Example 19. The non-transitory computer-readable media of any of the preceding examples, wherein the underlying data model is stored as metadata information.

Example 20. The non-transitory computer-readable media of any of the preceding examples, wherein the description comprises properties of the first entity type and data types the first entity type.

What is claimed is:

1. A computer-implemented method comprising:

receiving, by one or more processors, an identifier of a first entity type, the first entity type defining a relation between an application programming interface (API) and event information;

generating, by the one or more processors, based on the identifier of the first entity type, a reference for the first entity type, the reference linking the first entity type to the API;

providing, by the one or more processors, a description of the first entity type for storage using the reference for the first entity type, the description comprising a structure of an underlying data model;

receiving, by the one or more processors, a request to provide the first entity type based on the description of the first entity type; and in response to the received request, providing, by the one or more processors, the first entity type using an exposed API and the reference for the first entity type, wherein the exposed API comprises an adapted version of the API extended to provide a communication protocol comprising navigation to the first entity type.

2. The computer-implemented method of claim 1, further comprising:

generating, by the one or more processors, a mapping of the first entity type to a second entity type.

3. The computer-implemented method of claim 2, wherein the mapping comprises information indicative of local data models that are supported by the first entity type and the second entity type.

4. The computer-implemented method of claim 2, further comprising:

deriving, by the one or more processors, a data flow based on the mapping of the first entity type to the second entity type.

5. The computer-implemented method of claim 2, wherein the first entity type comprises a root entity and the second entity type comprises a sub-entity.

6. The computer-implemented method of claim 1, wherein the underlying data model is stored as metadata information.

7. The computer-implemented method of claim 1, wherein the reference comprises external files or locations.

8. The computer-implemented method of claim 1, wherein the description comprises properties of the first entity type and data types the first entity type.

9. A computer-implemented system comprising:

a memory storing application programming interface (API) information; and a server performing operations comprising:

receiving an identifier of a first entity type, the first entity type defining a relation between an application programming interface (API) and event information;

generating based on the identifier of the first entity type, a reference for the first entity type, the reference linking the first entity type to the API;

providing a description of the first entity type for storage using the reference for the first entity type, the description comprising a structure of an underlying data model;

receiving a request to provide the first entity type based on the description of the first entity type; and in response to the received request, providing the first entity type using an exposed API and the reference for the first entity type, wherein the exposed API comprises an adapted version of the API extended to provide a communication protocol comprising navigation to the first entity type.

10. The computer-implemented system of claim 9, wherein the operations further comprise:

generating a mapping of the first entity type to a second entity type.

11. The computer-implemented system of claim 10, wherein the mapping comprises information indicative of local data models that are supported by the first entity type and the second entity type.

12. The computer-implemented system of claim 10, wherein the operations further comprise:

deriving a data flow based on the mapping of the first entity type to the second entity type.

13. The computer-implemented system of claim 10, wherein the first entity type comprises a root entity and the second entity type comprises a sub-entity.

14. The computer-implemented system of claim 9, wherein the underlying data model is stored as metadata information.

15. The computer-implemented system of claim 9, wherein the reference comprises external files or locations.

16. The computer-implemented system of claim 9, wherein the description comprises properties of the first entity type and data types the first entity type.

17. A non-transitory computer-readable media encoded with a computer program, the computer program comprising instructions that when executed by one or more computers cause the one or more computers to perform operations comprising:

receiving an identifier of a first entity type, the first entity type defining a relation between an application programming interface (API) and event information;

generating based on the identifier of the first entity type, a reference for the first entity type, the reference linking the first entity type to the API;

providing a description of the first entity type for storage using the reference for the first entity type, the description comprising a structure of an underlying data model;

receiving a request to provide the first entity type based on the description of the first entity type; and in response to the received request, providing the first entity type using an exposed API and the reference for the first entity type, wherein the exposed API comprises an adapted version of the API extended to provide a communication protocol comprising navigation to the first entity type.

18. The non-transitory computer-readable media of claim 17, wherein the operations further comprise:

generating a mapping of the first entity type to a second entity type, wherein the mapping comprises information indicative of local data models that are supported by the first entity type and the second entity type.

19. The non-transitory computer-readable media of claim 17, wherein the underlying data model is stored as metadata information.

20. The non-transitory computer-readable media of claim 17, wherein the description comprises properties of the first entity type and data types the first entity type.

* * * * *